April 29, 1969    H. GRIFFON    3,440,953
COOKING APPARATUS
Filed March 16, 1967
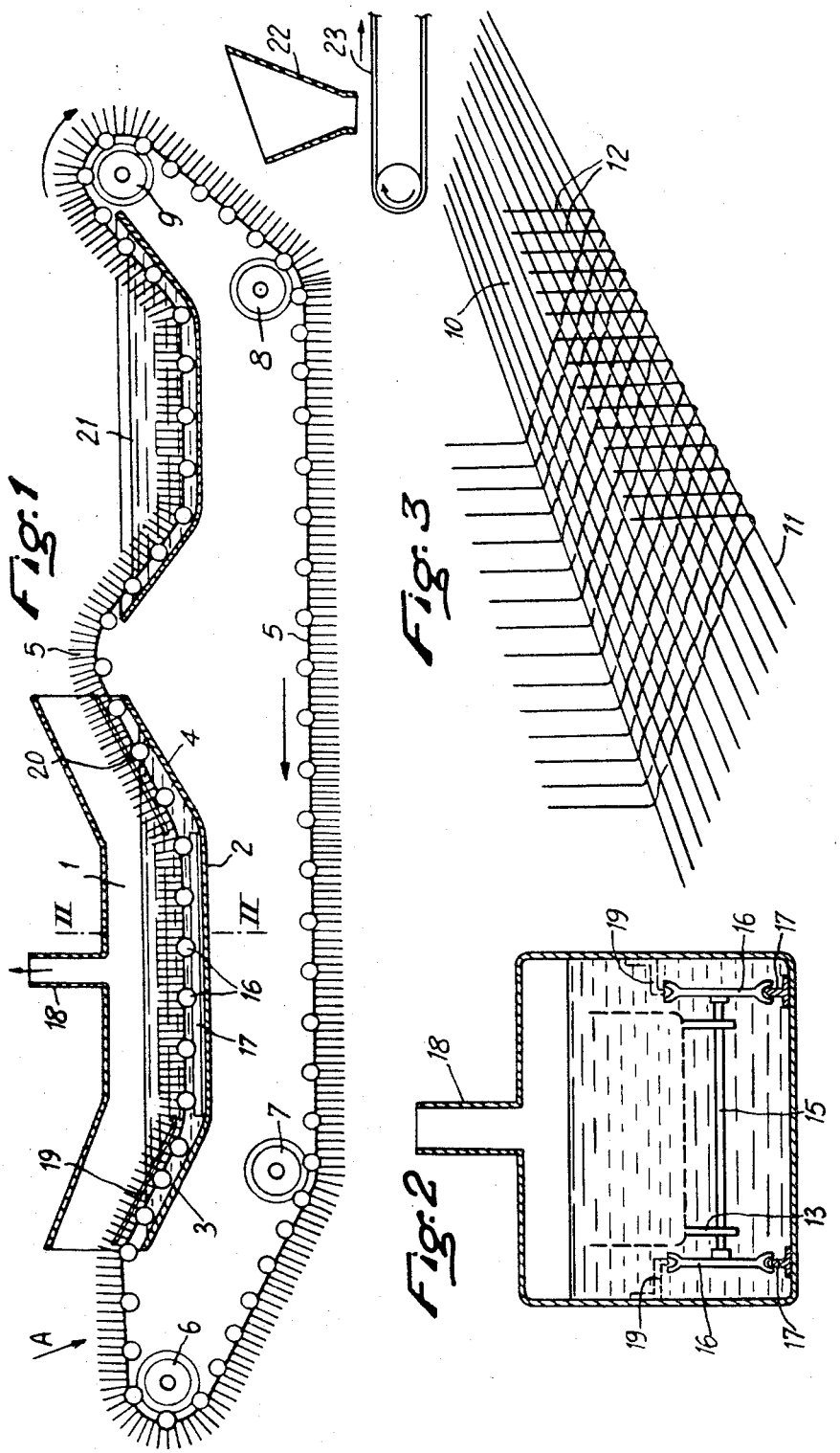

United States Patent Office 3,440,953
Patented Apr. 29, 1969

3,440,953
COOKING APPARATUS
Henri Griffon, Paris, France
(14 Ave. Gabriel Peri, Antony, Hauts-de-Seine, France)
Continuation-in-part of application Ser. No. 298,350, July 29, 1963. This application Mar. 16, 1967, Ser. No. 623,727
Claims priority, application France, July 30, 1962, 905,494; Jan. 28, 1963, 922,814
Int. Cl. A47j 27/00
U.S. Cl. 99—355    3 Claims

ABSTRACT OF THE DISCLOSURE

Cooking apparatus for cooking cut pieces of food having a continuous conveyor which carries the cut pieces down, through and out of a reservoir of cooking liquid in a tunnel-like boiler and then immediately down, through, up and out of a cooling tank, the conveyor then passing beneath the tank and boiler and returning to the latter's inlet end.

---

Continuation-in-part of application Ser. No. 298,350, July 29, 1963. Claims priority, application France July 30, 1962.

This invention relates to a cooking apparatus useful in the continuous dehydration of potatoes and other foods.

As disclosed in copending application Ser. No. 298,350, it is desirable in the dehydration of potatoes and other starchy vegetables that the cooking and cooling of the potatoes prior to dehydration be continuous, be conducted under water, that the cooking time be uniform with respect to all portions of the potatoes, that the cooling immediately follow the cooking and preferably also that the cooked potatoes be washed subsequently to cooking. The apparatus of this invention provides an improved and novel means for performing such a cooking process.

The apparatus of this invention comprises a tunnel-like boiler, the inlet and outlet of which are raised so as to provide a water reservoir therein, the tunnel-type boiler being traversed by a flexible endless conveyor serving as carrier for the potatoes or the like, the speed of said conveyor being regulated so that the period of immersion in the water of the boiler corresponds to that necessary for the cooking operation.

The tunnel-type boiler is preferably equipped in its central section with an exhaust conduit for the steam which is liberated in the cooking operation so as to prevent the steam from entering the room in which the apparatus is located.

The flexible conveyor advantageously comprises a perforated bottom and extensible lateral walls, the upper side being open. It may be made of any appropriate material, e.g., a plastic material which is resistant to the maximum cooking temperature, or metal, e.g., stainless steel or aluminum. In one embodiment its bottom comprises a metal grid or lattice, the transverse wires of which are bent upwardly and perpendicularly to the bottom to form the sides.

When the apparatus is to be used for the preparation of a pulp or puree to be subjected to a dehydration process, the tunnel boiler is followed by a cooling tank through which the conveyor also extends, the conveyor then discharging the cooked and cooled tubers into a pulping press which converts the material to a pulp or puree which is then transported to a dehydration section (not shown in the drawings).

By way of example and in order to facilitate understanding of the present specification, reference is made to the accompanying drawing, wherein;

FIGURE 1 is a diagrammatic longitudinal section of an apparatus according to the invention;

FIGURE 2 is the corresponding view in vertical section and to a larger scale, on the line II—II of FIGURE 1;

FIGURE 3 is a perspective view of one embodiment of an endless conveyor.

In the apparatus shown in the drawings, the tunnel-type boiler 1 comprises a central section 2 with a substantially flat base and two sloping sections, an introduction section 3 and a discharge section 4. Heating may be by any conventional means (not shown), e.g., an external flame, a coil or a double bottom traversed by steam or an electrical coil, in central section 2.

Extending through the boiler is a conveyor 5 which is equipped with bearing rollers which run over circular guide members or the like, such as 6, 7, 8 and 9.

The conveyor is in the form of a mesh or grid 10, formed of stainless steel, having metal warp wires 11 and transverse weft wires 12, for example, of a diameter of about 2 mm. To form the sides, a number of warp wires are omitted from each side of the grid-like conveyor so as to leave free a length on each end of the weft wires corresponding to the desired height of sides of the conveyor. These free ends are bent up so as to be perpendicular to the bottom, as indicated at 12. There are thus obtained extensible sides which are not resistant to the deformations to which the conveyor is subjected in its flexing movements during its travel, particularly on passing over the guide rollers 6, 7, 8 and 9.

In the tunnel-type boiler, the conveyor is mounted on a multiplicity of axles 15, on each of which are mounted rol'ers 16 which travel on rails 17.

Optionally, upper guide rails 19 and 20 are mounted on the sides of the boiler 1 to prevent lifting movements of the conveyor resulting from the driving thereof.

Provided in the top of the central section is an exhaust conduit 18 for the steam which is generated, which prevents steam escaping into the workroom.

Following the tunnel-type boiler is an open cooling tank 21 which contains guide means for the conveyor like those in the boiler.

On leaving the tank 21, the conveyor passes over a guiding and driving roller 9. The conveyor then passes over guide rollers 6 and 7 and returns to the introductory portion 3 of the boiler 1.

Disposed vertically beneath driving roller 9 is a pulping press 22, in which the cooked and cooled potatoes can fall freely because the conveyor is not closed on its upper side. The puree or pulp which is obtained can then be conducted by a conveyor 23 to the dehydration section (not shown in the drawing).

The following is a description of a dehydration process utilizing the apparatus of this invention.

Potatoes are washed, scrubbed and preferably peeled mechanically or by steam using conventional methods. They are then cut into relatively uniform small pieces, e.g., cubes or dices having sides of about 1 to 2 cm. This operation is also carried out using any conventional cutter device. It is conducted under water so that the potatoes are protected from oxidation and also are washed, thus extracting the starch and freeing them from any skin, debris, earth, etc.

As the potatoes are cut up, they are placed at A on conveyor 5. They are then carried by the conveyor through boiling water maintained in the reservoir provided by the tunnel-type boiler 1 at a speed such that each piece of potato is kept in the boiling water only for the period of time necessary to cook the potatoes, i.e., from 12 to 15 minutes, depending on the size and type of potato. At the outlet end, the conveyor with its load of cooked pieces of potatoes enters the cold water tank 21, where the cooked pieces of potato are immediately cooled, and then the conveyor tips the potatoes into the continuously running pulping press 22.

In order to obtain a pulp of a suitable consistency, a quantity of water is added, i.e., from about a third to a half of the weight of the cooled pieces of potato. This addition of water can be made in the pulping press, or in a mixer at the outlet from the latter, or partially at both places.

The pulp and water mixture is then beaten into an emulsion by occlusion of air in order to obtain a creamy product. Such an emulsion is advantageous to the subsequent dehydration step. This beating can be carried out with any suitable conventional apparatus, e.g., a mechanical beater. This operation can also be combined in a simple apparatus with all or part of the addition of water described above. If desired, a portion of the water can be in the form of milk, the total quantity of water being kept substantially the same.

The creamy pulp thus obtained is then dehydrated in any appropriate apparatus, preferably by the apparatus which is the subject of patent application Ser. No. 298,074, filed July 29, 1963, now U.S. 3,266,558.

Under these conditions, after dehydration, a solid product is obtained in the form of flakes or powder, which can be converted by the user, by simple addition of the necessary quantity of water, into a milky pulp equivalent to conventional mashed potatoes.

The dehydrated product is collected and then, if desired, it is ground and screened (preferably a number 60 screen). There is thus obtained a dry pulverous substance, the water content of which is about 10 to 15 percent of the dry material. Good results are obtained carrying the dehydration only as far as this latter value, and that the products obtained with this water content are preserved satisfactorily.

This powder can be reconstituted after appropriate heating into mashed potatoes or a potato puree by adding water or milk or a mixture of these two liquids thereto. Using the powder, to which water and milk are added, it is possible to make all the culinary preparations which have as their base potatoes in the form of a puree, such as souffle, fritters, pancakes, croquettes, potato soup, etc.

The apparatus can be used not only for vegetable substances similar to potatoes, but for all types of foodstuffs requiring cooking followed by cooling, including animal substances. Thus, the present apparatus can be used for the preparation of powders of chicken meat, fish, etc. In the case of chicken, for example, the flesh is boiled followed by cooling in the apparatus described herein. The meat then has very little adherence to the bones so that it can be detached easily and completely therefrom. It is then subjected to the processes previously described for the preparation of a homogeneous paste by grinding with water and desiccation.

As a specific example, 20 kilograms of potatoes are peeled and cut under water in small pieces of about 1–2 cc. The peeling reduces the weight to about 18 kilograms. The potatoes remain under water for a period of about 10–12 minutes.

Without having been exposed to the air, the pieces of cut potato are then placed on conveyor 5 at point A, where they are transported to the central section 2 of the boiler 1 and immersed in boiling water from 12–15 minutes so that cooking is complete.

After boiling, the potatoes are transported by conveyor 5 to cooling tank 21, where the cooked pieces of potato are immediately immersed in a stream of cold water, whereby the heat is rapidly removed and, at the same time, remaining solanine is washed from the pieces of potato.

Next, the potato pieces are taken out of the water to conveyor 5, drained and mashed. Six liters of water are added and the mash is whipped in order to obtain a foamy cream.

This cream is then dehydrated by the process described in U.S. Patent 3,266,558.

What is claimed:

1. Cooking apparatus adapted for cooking cut pieces of food comprising, in combination,
    a boiler in the form of a tunnel, having an inlet at one end and an outlet at the other end which are raised in relation to the central section and whose bottom and sides below the inlet and outlet form a liquid reservoir;
    a cooling tank adjacent the outlet end of the boiler; and
    a continuous conveyor, adapted for conveying cut pieces of food and having a perforated bottom and extensible side walls and an open top which traverses the boiler and cooling tank by passing into the inlet end of the boiler, downwardly into, through, and upwardly out of the reservoir, out the outlet end of the boiler, downwardly into, through, and upwardly out of the cooling tank and then passes downwardly beneath the cooling tank and boiler and returns to the inlet end of the boiler.

2. Cooking apparatus adapted for cooking cut pieces of food comprising, in combination,
    a boiler in the form of a tunnel, having an inlet at one end and an outlet at the other end which are raised in relation to the central section and whose bottom and sides below the inlet and outlet form a liquid reservoir;
    a cooling tank immediately adjacent the outlet end of the boiler; and
    a continuous conveyor, adapted for conveying cut pieces of food and having a perforated bottom and extensible side walls and an open top which traverses the boiler and cooling tank by passing into the inlet end of the boiler, downwardly into, through, and upwardly out of the reservoir, out the outlet end of a boiler, downwardly into, through, and upwardly out of the cooling tank and then passes downwardly beneath the cooling tank and boiler and returns to the inlet end of the boiler, said conveyor being formed of a multiplicity of longitudinally positioned wires and a multiplicity of laterally positioned metal wires woven to form a grid-like bottom, the transverse wires of which are disposed upwardly at an angle to the bottom to form sides and the longitudinal wires of which form only the bottom of the conveyor.

3. Cooking apparatus for cooking cut pieces of food comprising, in combination,
    a boiler in the form of a tunnel, having an inlet at one end and an outlet at the other end which are raised in relation to the central section and whose bottom and sides below the inlet and outlet form a liquid reservoir;
    a cooling tank immediately adjacent the outlet end of the boiler; and
    a continuous conveyor, adapted for conveying cut pieces of food and having a perforated bottom and extensible side walls and an open top which traverses the boiler and cooling tank by passing into the inlet end of the boiler, downwardly into, through, and upwardly out of the reservoir, out the outlet end of the boiler, downwardly into, through, and upwardly out of the cooling tank and then passes downwardly beneath the cooling tank and boiler and returns to the inlet end of the boiler, said conveyor being formed of a multiplicity of longitudinally positioned wires and a multiplicity of laterally positioned metal wires woven to form a grid-like bottom, the transverse wires of which are disposed upwardly at an angle to the bottom to form open sides and the longitudinal wires of which form only the bottom of the conveyor and said conveyor being mounted on wheels which ride on guide tracks mounted on the boiler.

References Cited

UNITED STATES PATENTS

| | | | |
|---|---|---|---|
| 1,625,070 | 4/1927 | Bailey | 99—405 |
| 2,286,644 | 6/1942 | Pringle | 99—100 |
| 2,391,630 | 12/1945 | Kibler | 99—405 |
| 3,063,846 | 11/1962 | Polin | 99—404 |

ROBERT W. JENKINS, *Primary Examiner.*

U.S. Cl. X.R.

99—404, 443, 207